(12) United States Patent
Otake

(10) Patent No.: US 6,477,364 B1
(45) Date of Patent: Nov. 5, 2002

(54) AUTOMATIC REDIALING METHOD FOR A MOBILE COMMUNICATION NETWORK AND A MOBILE COMMUNICATION SYSTEM

(75) Inventor: Tsuyoshi Otake, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/224,301

(22) Filed: Dec. 31, 1998

(30) Foreign Application Priority Data

Apr. 8, 1998 (JP) ............................................ 10-095567

(51) Int. Cl.[7] ................................................ H04M 3/42
(52) U.S. Cl. .................................. 455/414; 379/209.01
(58) Field of Search .............................. 455/414, 415, 455/564, 561, 458, 459, 461, 567, 528, 460; 379/209, 209.01, 210.01, 265.01, 265.02, 265.11

(56) References Cited

U.S. PATENT DOCUMENTS

| | | | | |
|---|---|---|---|---|
| 3,355,555 A | * | 11/1967 | Thelemaque | 379/209 |
| 3,885,108 A | * | 5/1975 | Zock | 379/209 |
| 4,887,294 A | * | 12/1989 | Ruey-Guang | 379/209 |
| 5,153,908 A | * | 10/1992 | Kakizawa et al. | 379/157 |
| 5,313,517 A | * | 5/1994 | Inaguma | 379/67.1 |
| 5,406,616 A | * | 4/1995 | Bjorndahl | 455/433 |
| 5,504,804 A | * | 4/1996 | Widmark et al. | 455/414 |
| 5,515,420 A | * | 5/1996 | Urasaka et al. | 455/564 |
| 5,960,357 A | * | 9/1999 | Kim | 455/462 |
| 5,995,848 A | * | 11/1999 | Nguyen | 455/414 |
| 6,009,157 A | * | 12/1999 | Bales et al. | 379/209 |
| 6,035,031 A | * | 7/2000 | Silverman | 379/209 |
| 6,339,640 B1 | * | 1/2002 | Chen et al. | 379/201.01 |

FOREIGN PATENT DOCUMENTS

| JP | 289681/1997 | 11/1921 |
|---|---|---|
| JP | 09-289681 | 11/1997 |

* cited by examiner

Primary Examiner—Nay Maung
Assistant Examiner—Lewis West
(74) Attorney, Agent, or Firm—Rabin & Berdo, P.C.

(57) ABSTRACT

An automatic redialing method for amiable communication network and a mobile communication system are disclosed. When a call meant for a telephone terminal belonging to a public switched telephone network is originated on a mobile station, but the telephone terminal is busy, a mobile communication exchange receives BUSY information from an exchange covering the telephone terminal on a control line. The mobile communication exchange transfers the BUSY information to a base station covering the calling mobile station. The base station transforms the BUSY information to a corresponding BUSY message capable of being sent on a radio channel and sends the BUSY message to the mobile station by adding it to the control field of a reverse control channel. On receiving the BUSY message, the mobile station once disconnects the channel, sets its timer, and redials the telephone terminal on the elapse of a preselected period of time.

3 Claims, 12 Drawing Sheets

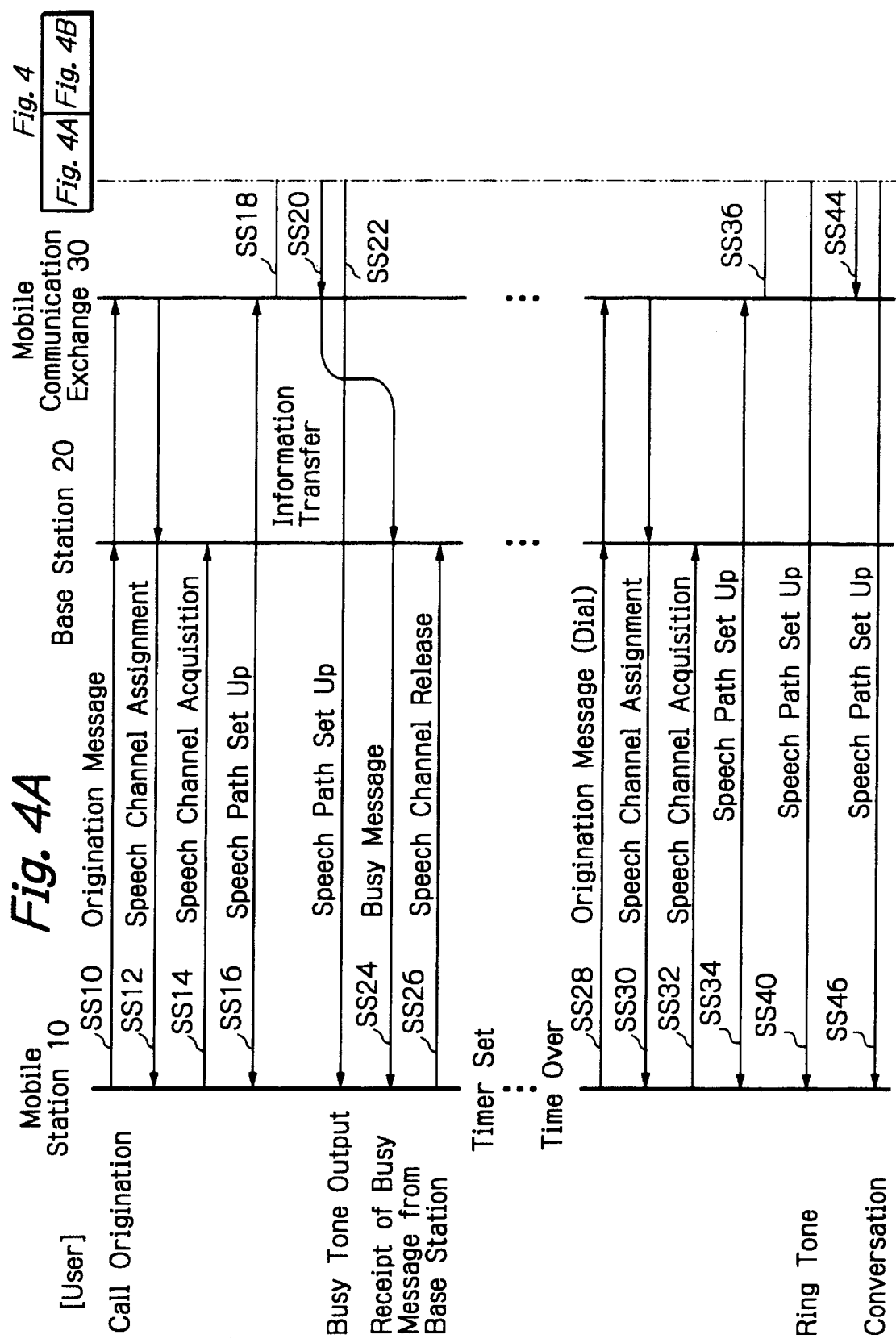

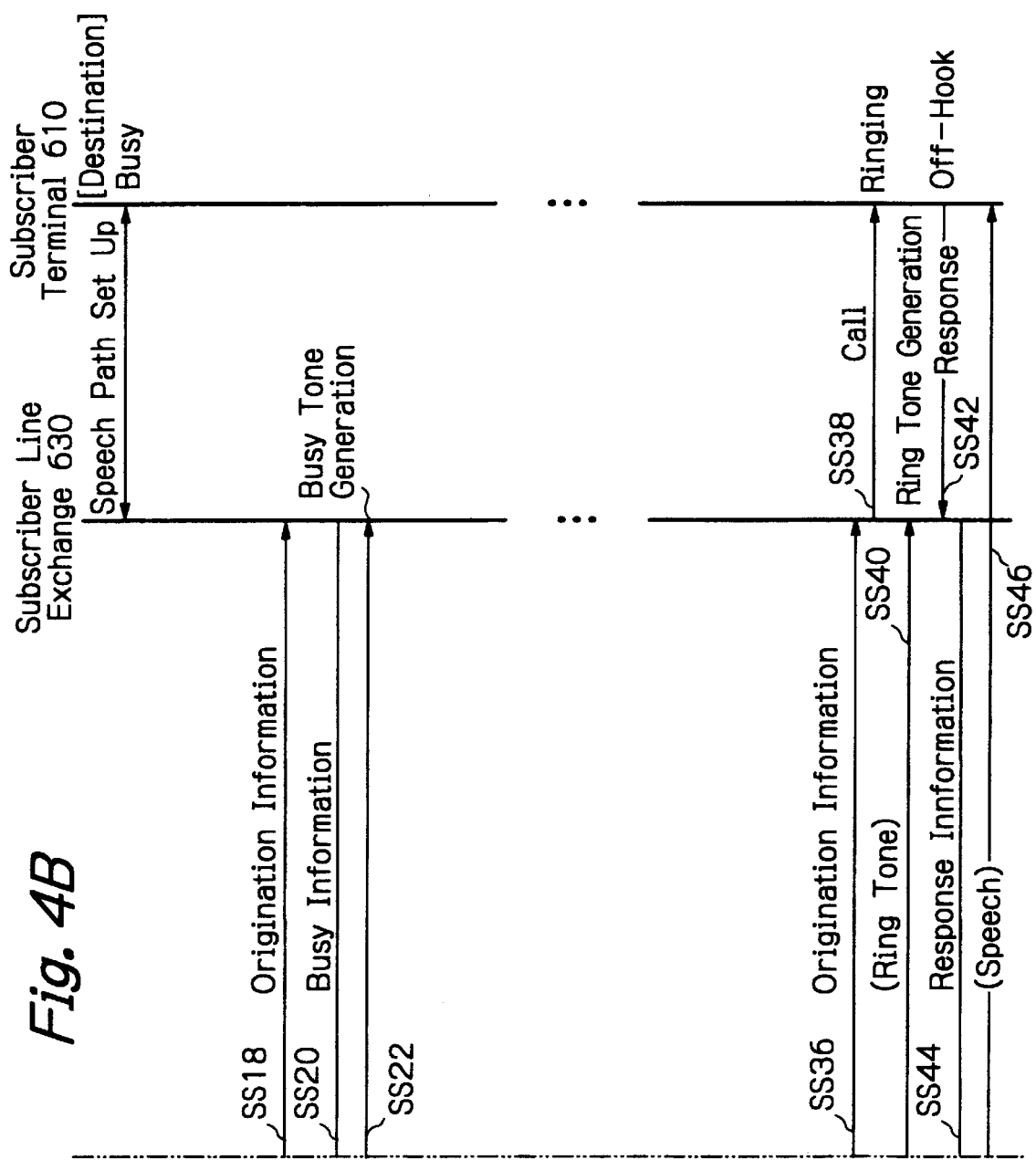

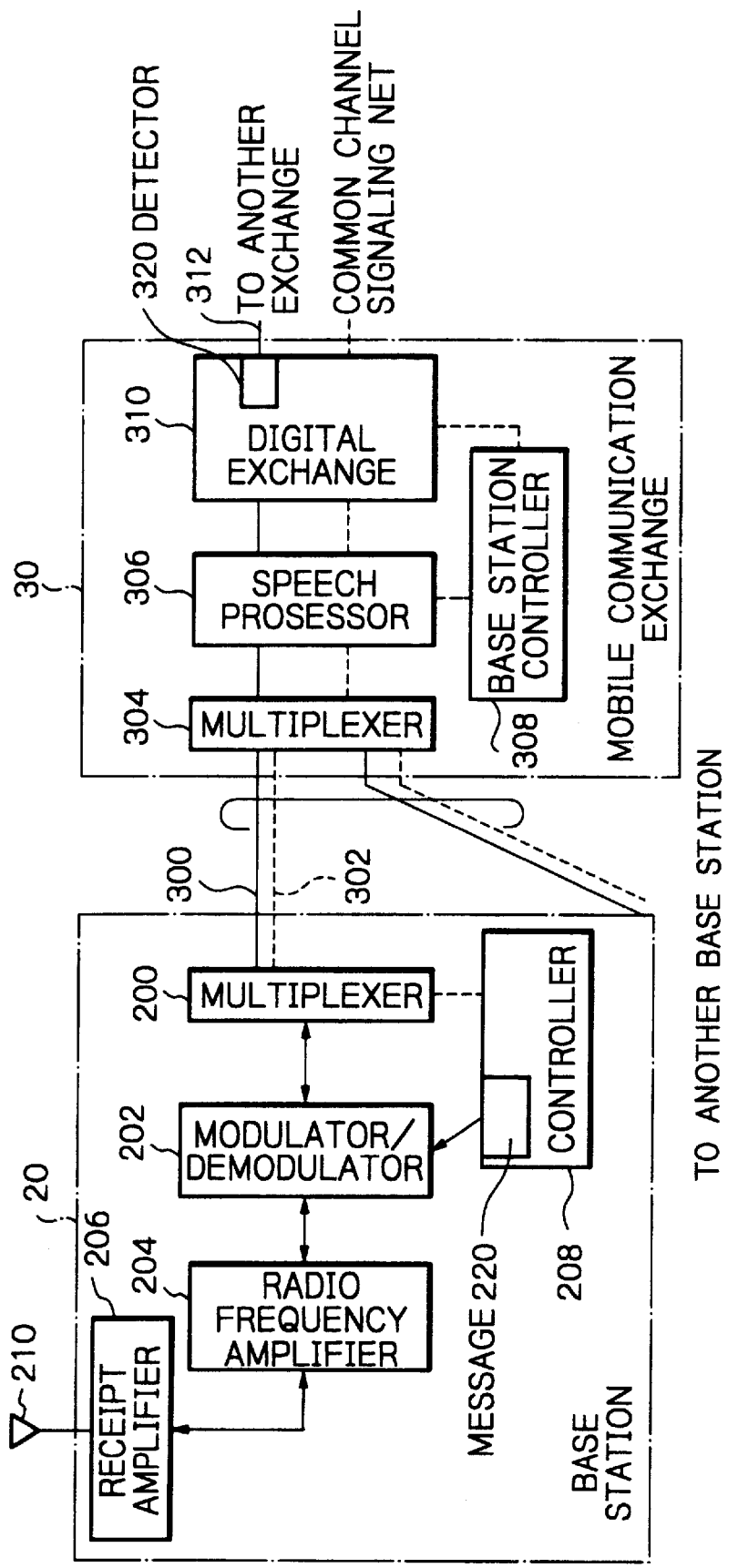

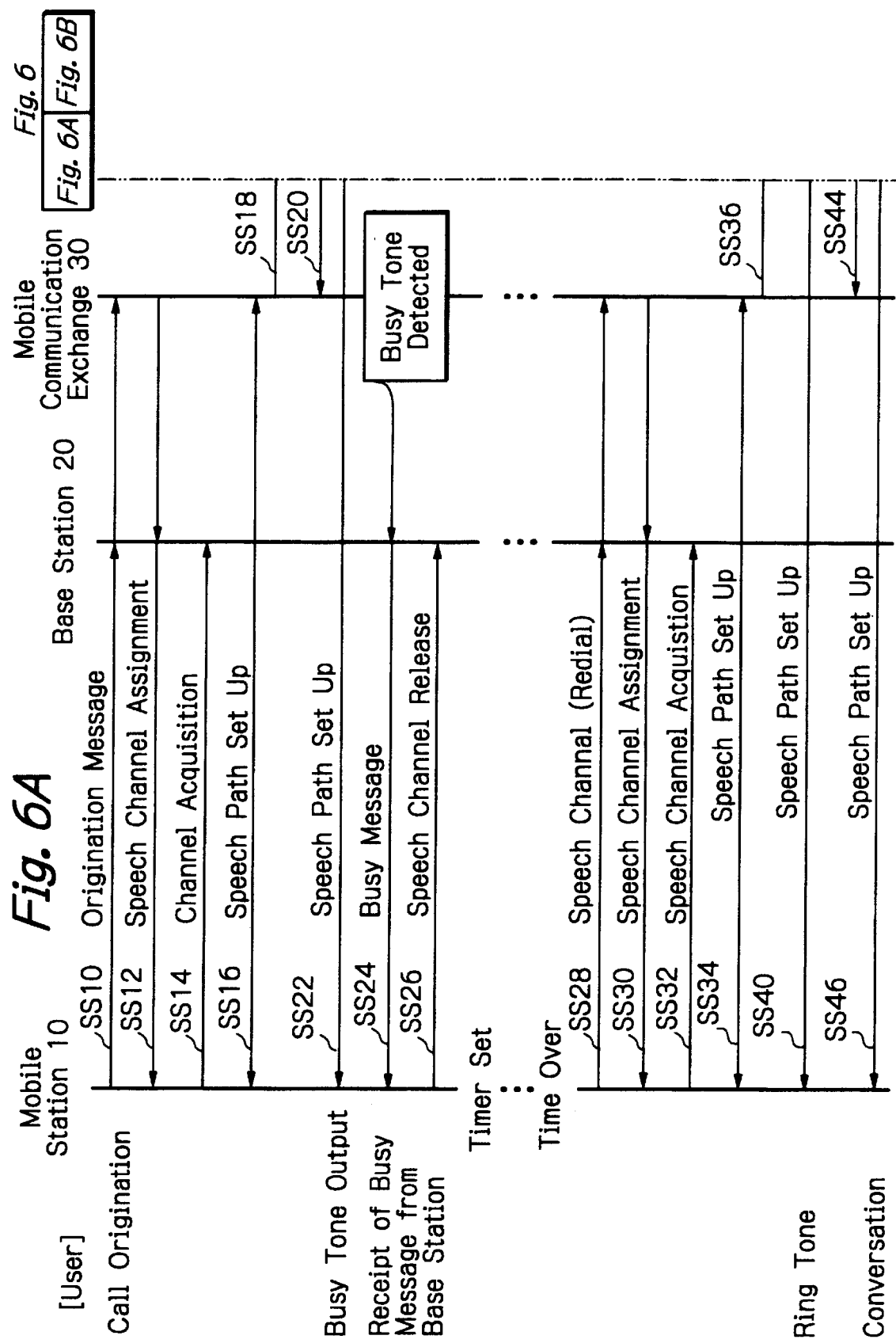

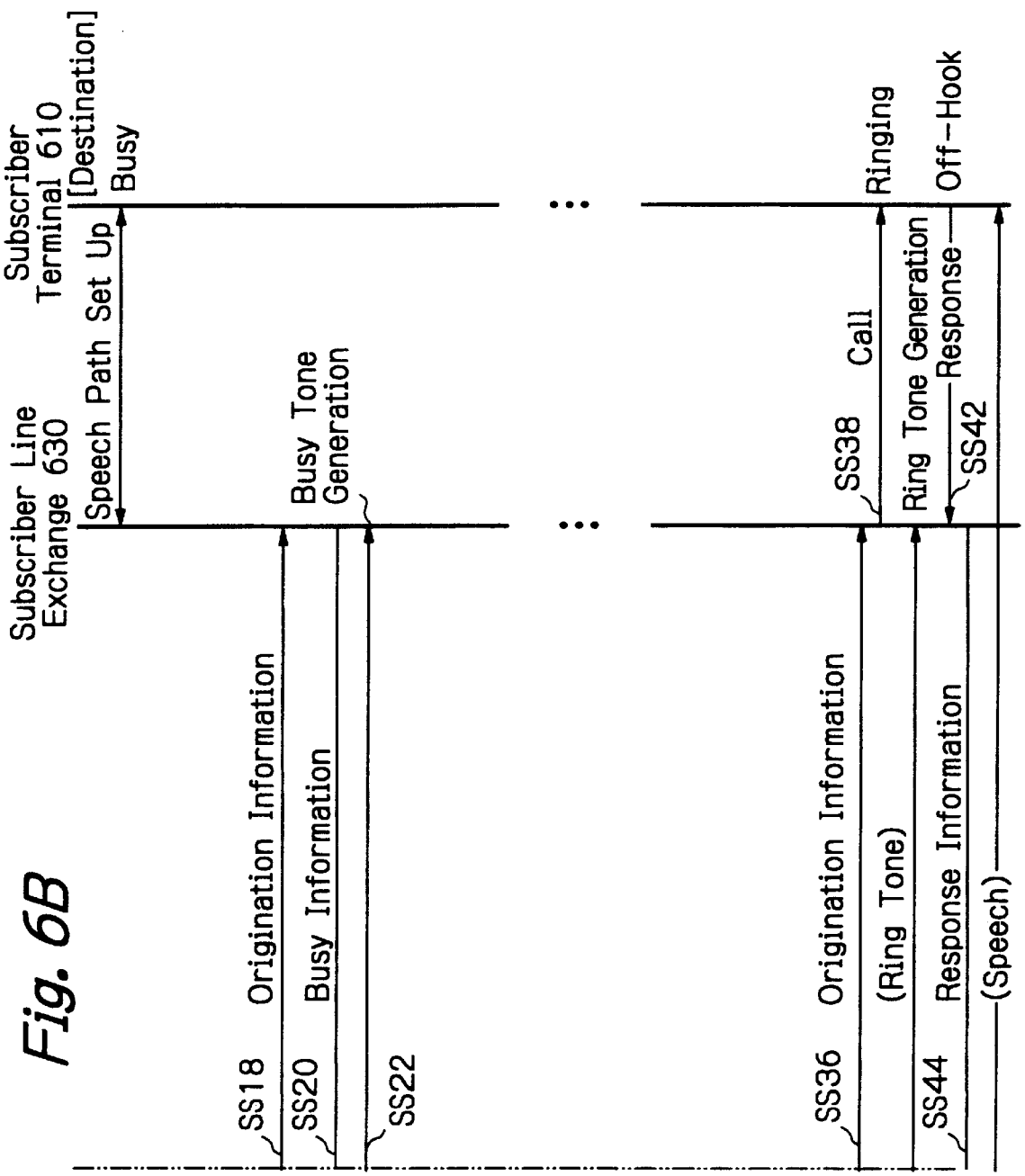

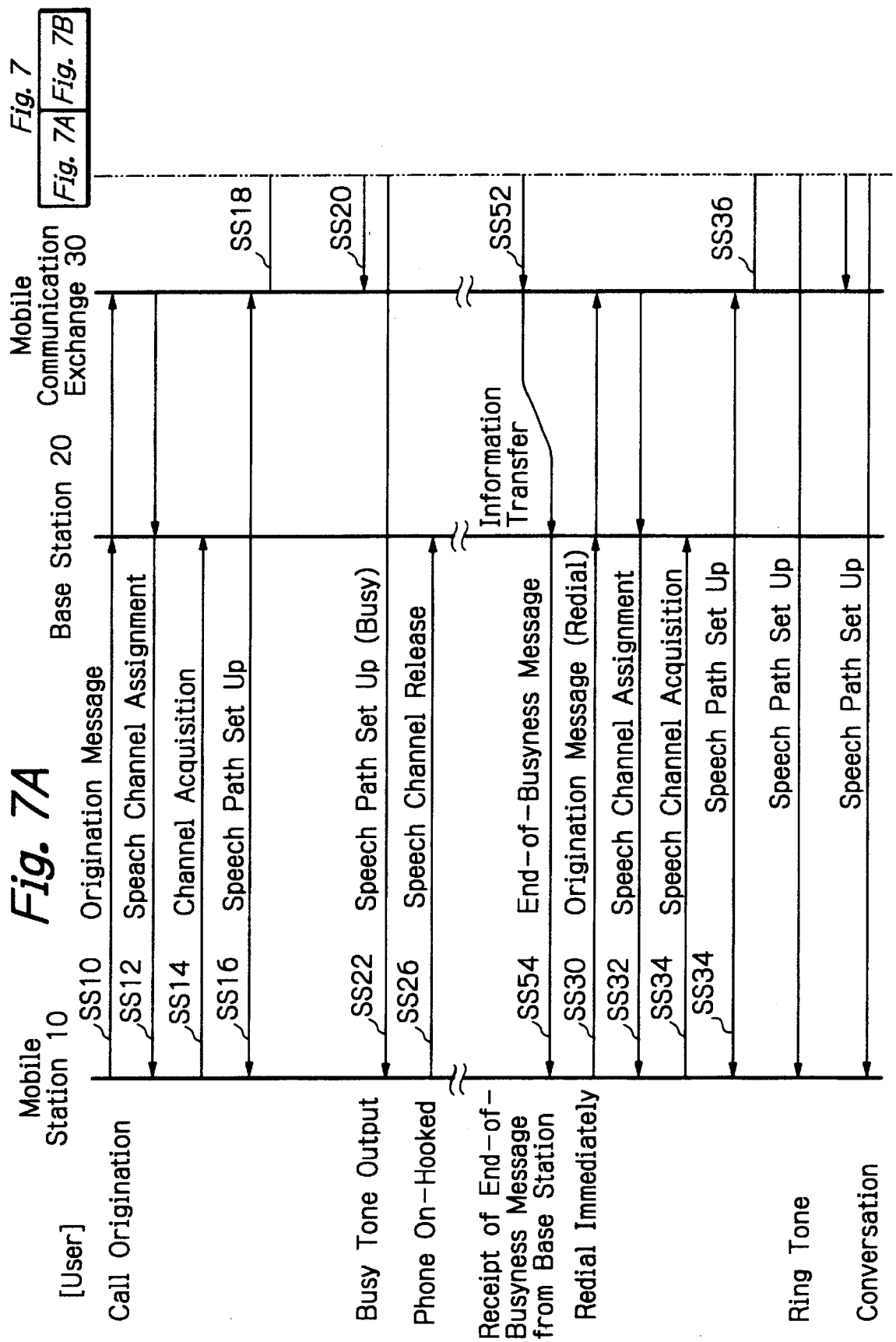

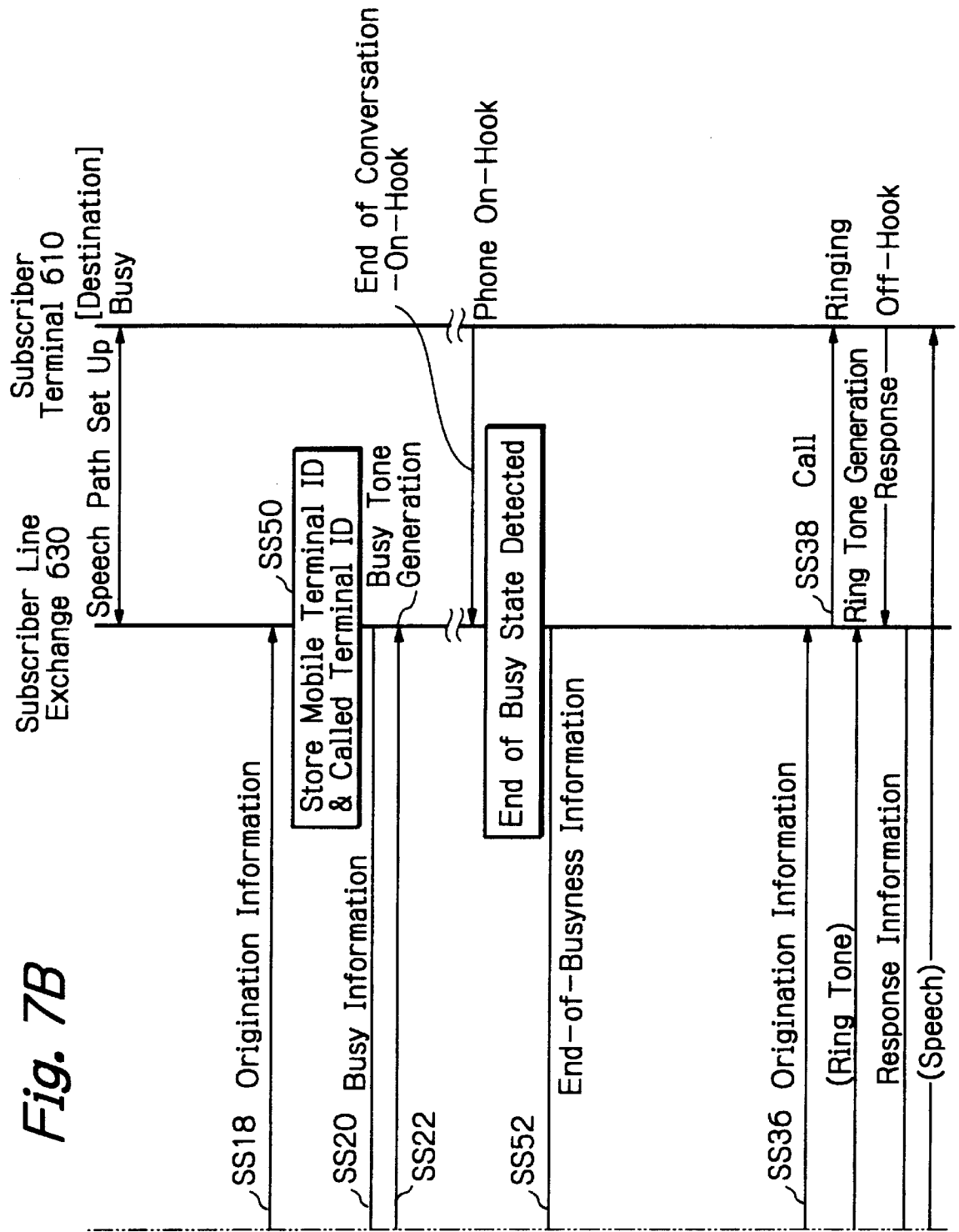

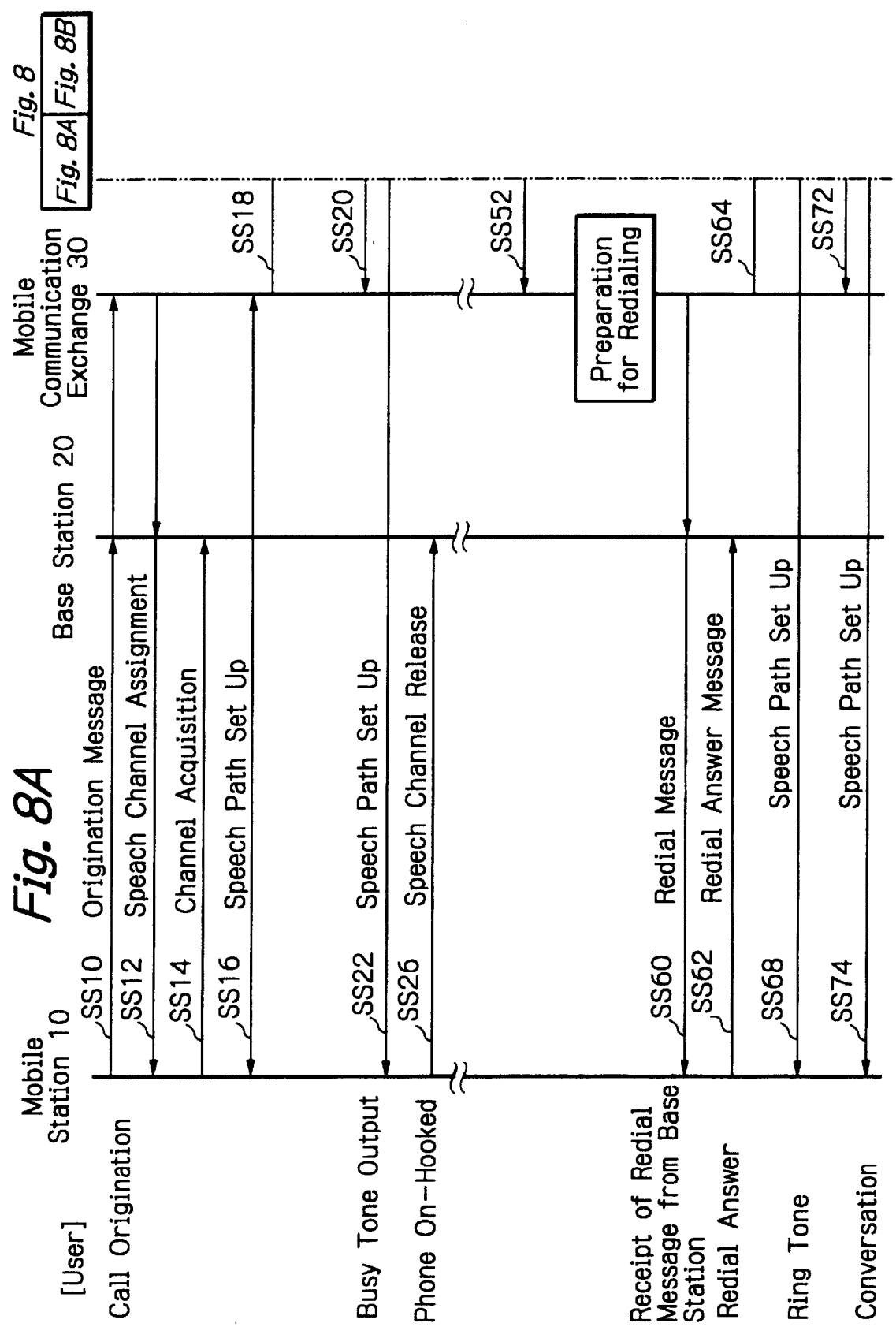

AUTOMATIC REDIALING METHOD FOR A MOBILE COMMUNICATION NETWORK AND A MOBILE COMMUNICATION SYSTEM

BACKGROUND OF THE INVENTION

1. Field of the Art

The present invention relates to an automatic redialing method for a mobile communication network and a mobile communication system. More particularly, the present invention is concerned with an automatic redialing method applicable to a mobile communication network accommodating hand phones, car phones or similar mobile terminals.

2. Description of the Background Art

In a mobile communication system accommodating mobile terminals, e.g., hand phones or car phones extensively used today, the digitization and high integration of devices have promoted the reduced size light weight configuration of the terminals. In addition, the broadening communication area and reciprocal services available between different districts have implemented conversation at any place or in any district and have further accelerated the spread of the mobile terminals.

Generally, a mobile communication system includes portable terminals or similar mobile stations, base stations each covering the mobile stations in an area on radio links, and mobile communication exchanges each accommodating a plurality of base stations for connecting a call originating from any mobile station en route to destination. The mobile communication exchanges are interconnected by transit switches, and each is connectable to a public switched telephone network or similar fixed network or to another mobile communication network via, e.g., a gateway office.

When a call originates any one of the mobile stations belonging to the above system, the mobile station acquires the reverse control channel of the base station covering the mobile station. Then, the mobile station sends an origination message including the ID (Identification) number of the called terminal over the control channel at a preselected timing. The base station having received the origination message transfers the information included in the message to the associated mobile communication exchange. At the same time, the base station sets up a communication channel between itself and the calling mobile station so as to establish a communication path between the mobile station and the mobile communication exchange.

The mobile communication exchange connects based on the received origination information, communication the path to an exchange on the called side accommodating the called terminal and in turn calls the terminal. For example, if the called terminal is a telephone terminal connected to a public switched telephone network, then the mobile communication exchange sends the origination information to the telephone network via, e.g., a gateway. When the origination information is transferred from the telephone network to a subscriber line exchange accommodating the called telephone terminal, the subscriber line exchange activates a subscriber line assigned to the telephone terminal while sending a ring tone to the calling side on the communication path. As a result, a ringing tone is generated from the telephone terminal while the ring tone is sent to the mobile station on the speech channel.

On the other hand, when the called telephone terminal is busy, the subscriber line exchange detects the busy state of the terminal and sends a busy tone to the calling side on the communication path. The user of the calling mobile station, hearing the busy tone, recognizes the busy state of the telephone terminal and hangs-up or otherwise disconnects the channel. The user of the mobile station may again call the telephone terminal later by, e.g., pressing a redial button provided on the mobile station. That is, a redialing function has customarily been implemented by manual operation.

It sometimes occurs that the channel between the mobile station and the base station cannot be set up due to channel congestion or some other similar cause. The conventional mobile station has an automatic re-setting or redialing function for coping with such an occurrence. For example, the mobile station executes the automatic re-setting or redialing function when an origination request sent from the mobile station is not acknowledged by the base station, when the mobile station fails to receive an answer from the base station despite that the base station has acknowledged the origination request, when no speech channels are assigned to the mobile station after the acknowledgement, or when the base station fails to receive an answer returned from the mobile station at the time of switching of the speech channel. In any case, the mobile station starts a timer at the same time as it sends an origination message and repeats, if a channel is not set up on the elapse of a preselected period of time, the call origination procedure until the establishment of a channel.

However, the automatic redialing function available with the conventional mobile station is limited to the establishment of a channel between the mobile station and the base station. When the called terminal is busy, the user of the mobile station must repeatedly call the desired terminal by hand, resulting in time-wasting and labor-consuming operation. Automatic redialing maybe implemented if an extra circuit for detecting a busy tone is added to the mobile terminal. However, the addition of a new circuit would obstruct the miniaturization of the mobile station and would increase the cost of the mobile station.

SUMMARY OF THE INVENTION

It is therefore an object of the present invention to provide an automatic redialing method for a mobile communication network and a mobile communication system capable of automatically redialing a desired terminal without resorting to any additional circuit.

In accordance with the present invention, an automatic redialing method for a mobile communication network allows a mobile station belonging to the network and having originated a call to redial, if a called terminal including a fixed terminal of a public network is busy, the called terminal when the busy state of the called terminal ends. The method begins with a step of causing a mobile station exchange to send, when a call originates from the mobile station, origination information including a first identification assigned to the mobile station and a second identification assigned to the called terminal to an exchange accommodating the called terminal on a control line. The exchange accommodating the called terminal stores, when the called terminal is busy, the first and second identifications and monitors the state of the called terminal. On detecting the end of the busy state of the called terminal, the above exchange sends end-of busyness information including the first and second identifications to the mobile communication exchange on the control line. The mobile communication exchange having received the end-of-busyness information transfers, based on the first identification included in the send-of-busyness information, the end-of-busyness information to a base station covering the mobile station. The base station having received the end-of-busyness signal generates a corresponding end-of-busyness message and sends the message to the mobile station on the control channel of a reverse radio channel. The mobile station having received the end-of-busyness message redials the called terminal.

Also, in accordance with the present invention, a mobile communication system accommodating a mobile station on a radio channel and connectable at least to a public network includes a base station for setting up a radio link between itself and the mobile station. A mobile communication exchange accommodating the base station connects a call originating at a mobile station to a desired link including the public network. When a call originates from the mobile station, the mobile communication exchange sends origination information including the first identification of the mobile station and the second identification of a called terminal to an exchange accommodating the called terminal on a control line. The exchange accommodating the called terminal stores, when the called terminal is busy, the first and second identifications and monitors the state of the called terminal and sends, on detecting the end of the busy state of the called terminal, end-of-busyness information including the first and second identifications to the mobile communication exchange on the control line. The mobile communication exchange includes an information generating circuit for reporting, on receiving the end-of-busyness information from the exchange, the base station covering the mobile station that the mobile communication exchange will redial the called terminal, and a redialing function for redialing the called station on the basis of the second identification to thereby set up a speech path between the mobile station and the called terminal. The base station includes a message generating circuit for generating, when informed of a redialing to occur by the mobile communication exchange, a redial message representative of the redialing to occur and capable of being sent to the mobile station. The mobile station includes a message generating function for generating, on receiving the redial message from the base station, a redial answer message if a user of the mobile station is ready to respond, and sending the redial answer message to the base station.

BRIEF DESCRIPTION OF THE DRAWINGS

The objects and features of the present invention will become more apparent from the consideration of the following detailed description taken in conjunction with the accompanying drawings in which:

FIG. 4 shows how FIGS. 4A and 4B are combined;

FIGS. 4A and 4B are diagrams demonstrating the automatic redialing method applied to the system of FIG. 1;

FIG. 5 is a block diagram showing an alternative embodiment of the present invention;

FIG. 6 shows how FIGS. 6A and 6B are combined;

FIGS. 6A and 6B are diagrams demonstrating an automatic redialing method particular to the embodiment of FIG. 5;

FIG. 7 shows how FIGS. 7A and 7B are combined;

FIGS. 7A and 7B are diagrams showing another alternative embodiment of the present invention;

FIG. 8 shows how FIGS. 8A and 8B are combined; and

FIGS. 8A and 8B are diagrams showing a further alternative embodiment of the present invention.

DESCRIPTION OF THE PREFERRED EMBODIMENTS

Figure 1:
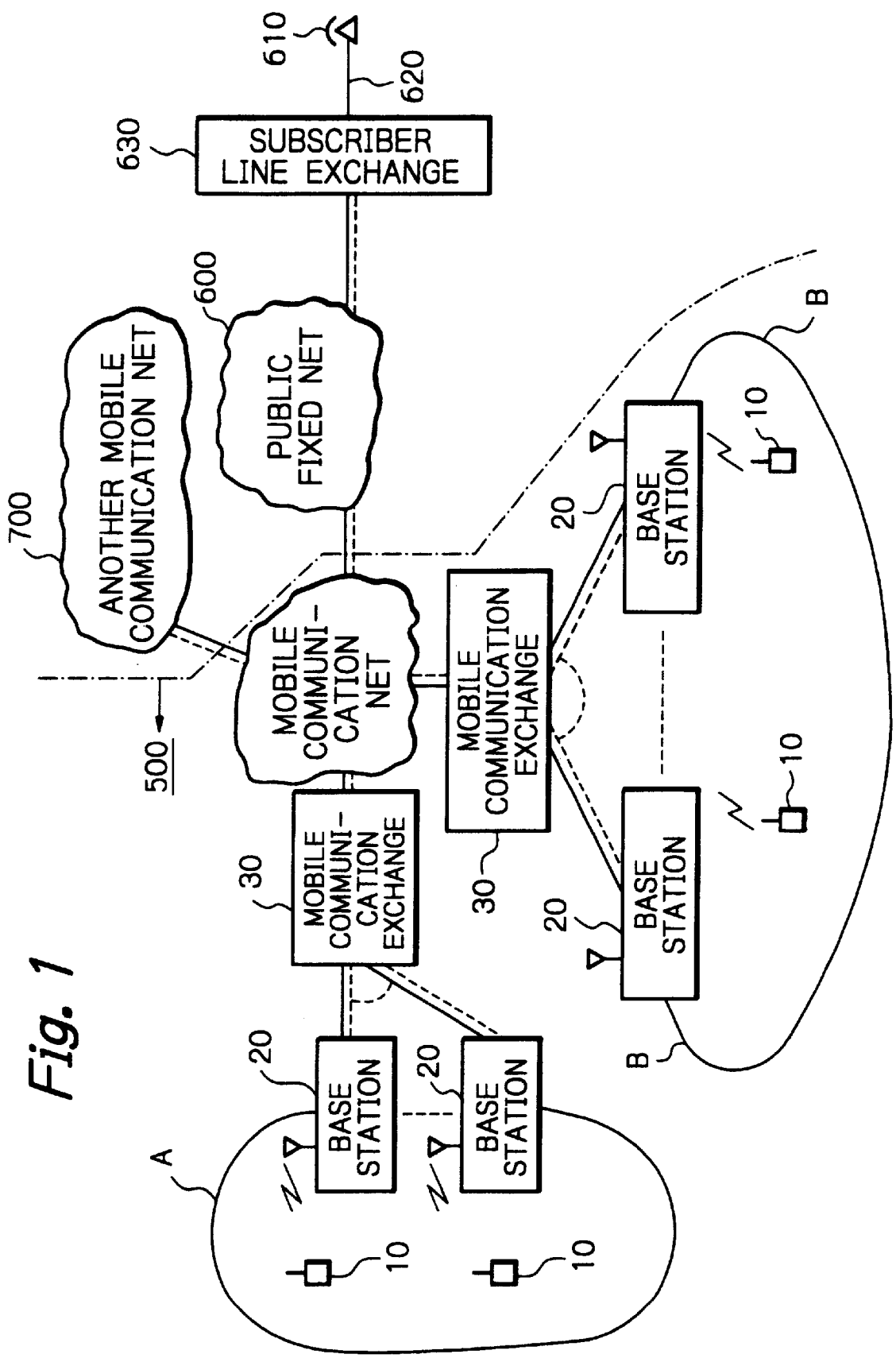
FIG. 1 shows a mobile communication system to which an automatic redialing method embodying the present invention is applicable.

Referring to FIG. 1 of the drawings, a mobile communication system implemented with an automatic redialing method embodying the present invention is shown. As shown, the mobile communication system forms a mobile communication network 500 accommodating mobile stations 10 via a plurality of base stations 20. The network 500 is capable of connecting a call originating from any one of the mobile stations 10 to a public switched telephone network or similar public fixed network 600 or another mobile communication network 700. In the illustrative embodiment, the network 500 may be effectively implemented as a cellular mobile communication system in which each service area consists of a plurality of small radio zones.

Assume that when a call meant for a desired terminal originates from one mobile station 10, the called terminal is busy. Then, with an automatic redialing function, the system of the illustrative embodiment allows the calling mobile station 10 to automatically redial the called terminal after a preselected period of time has elapsed without resorting to any manual operation. Specifically, assume a mobile communication exchange or switch 30 in which a base station 20 having received the call from the calling mobile station 10 is accommodated. Then, the exchange 30 reports the busy state of the called terminal to the mobile station 10 via the base station 20. In response, the mobile station 10 starts counting time and automatically redials the same called terminal after a preselected period of time has elapsed.

More specifically, a single service area A, for example, includes-the mobile stations 10, a plurality of base stations 20 to which the mobile stations 10 are connectable by radio, and at least one mobile communication exchange 30 accommodating the base stations 20. This basic configuration constitutes the mobile communication network 500 together with the mobile communication exchange 30 and base stations 20 of another service area B, transit, not shown, and gateway office, not shown. While FIG. 1 shows only two service areas A and B, the network 500 may, of course, include three or more service areas.

The mobile stations 10 each include a handy phone, car phone or similar mobile radio transmitter/receiver. In the illustrative embodiment, each mobile station 10 is implemented as a digital mobile terminal adaptive to, e.g., TDMA (Time Division Multiple Access) frames. Particularly, in the illustrative embodiment, the mobile stations 10 each has a redialing function, i.e., each is capable of receiving a message representative of the busy state of a called terminal (BUSY message hereinafter) from the base station 20 and redialing the called terminal after the passing a preselected period of time.

Figure 2:
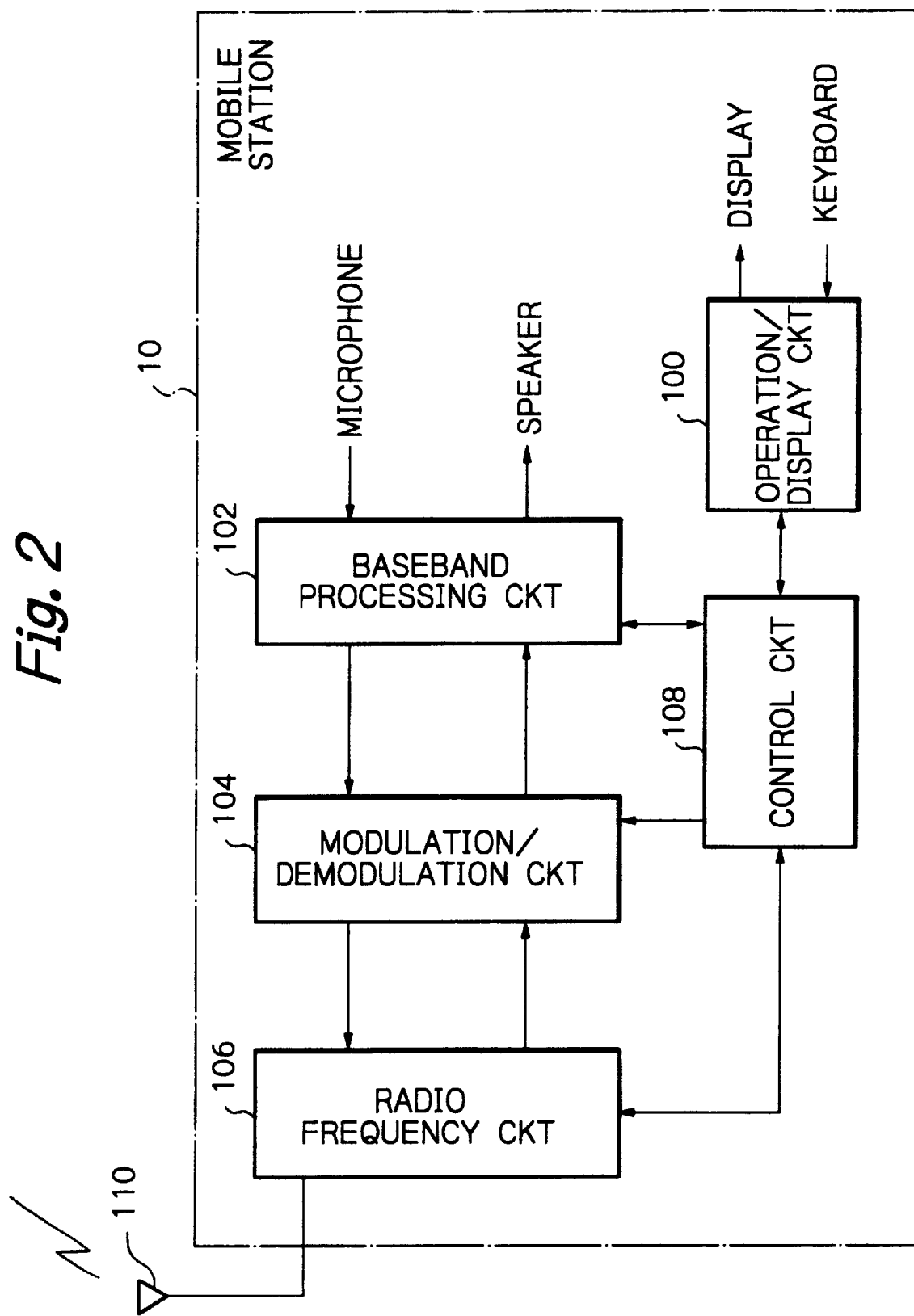
FIG. 2 is a block diagram schematically showing a specific configuration of a mobile station included in the system shown in FIG. 1.

FIG. 2 shows a specific construction of each mobile station 10. As shown, the mobile station 10 is generally made up of an operation/display circuit 100, a baseband processing circuit 102, a modulation/demodulation circuit 104, a radio frequency circuit 106, and a control circuit 108. A keyboard including various keys and an LCD (Liquid Crystal Display) or similar display are arranged on the mobile station 10, although not shown specifically. The operation/display circuit 100 plays the role of an input/ output control circuit for controlling key inputs on the keyboard and display outputs to the display. For example, at the time of call origination, the circuit 100 feeds a telephone number input on the keyboard to the control circuit 108 while displaying it on the display. If desired, the mobile station 10 may be provided with an exclusive button for allowing the user to decide whether or not to effect automatic redialing for each registered telephone number beforehand, or to cancel the automatic redialing function.

The baseband processing circuit, or speech processing circuit, 102 is connected to a transmitter/receiver including a microphone and a speaker, not shown. The processing circuit 102 includes a high efficiency coder for coding an input speech and a decoder for decoding a received speech code. In addition, the processing circuit 102 includes a TDMA processing section for compressing a coded signal and constructing it into a TDMA slot or for expanding a TDMA slot and feeding it to the decoder. In the illustrative embodiment, the TDMA processing section not only processes speech information, but also separates a control message from a received slot and feeds it to the control circuit 108 or constructs a control message output from the control circuit 108 into a slot to be sent.

The modulation/demodulation circuit 104 includes a modulator and a demodulator using a QPSK (Quadrature Phase Shift Keying) scheme, and a frequency synthesizer for switching a TDMA slot to a desired frequency channel.

The radio frequency circuit 106 includes a transmitting section and a receiving section which may advantageously be provided with a dual configuration for diversity receipt. The transmitting section executes high frequency amplification with a TDMA slot output from the modulation/ demodulation circuit 104 and sends the amplified slot via an antenna 110. The receiving section selectively receives a slot on a frequency channel assigned to the mobile station 10 and included in a TDMA frame received from the base station 20 via the antenna 110.

The control circuit 108 controls transmission at the time of call origination and controls receipt at the time of an incoming call. Specifically, the control circuit 108 generates, in response to the user's operation for originating a call an origination message including the telephone number of a terminal to be called or generates, on receiving a control message from the base station 20, a preselected answer message. In this sense, the control circuit 108 plays the role of a message generating circuit. In the illustrative embodiment, the control circuit 108 includes a CPU (Central Processing Unit) for controlling the various sections of the mobile station 10, a RAM (Random Access Memory) for storing various data, and a ROM (Read Only Memory) storing a control program and various fixed data beforehand.

Particularly, in the illustrative embodiment, the above ROM additionally stores a control program for implementing three different functions, i.e., a function of temporarily storing the origination message generated at the time of call origination, a function of counting a preselected period of time, and reading out the stored message on the elapse of the above period of time and again originating a call. At the time of redialing, a ring tone or the like may advantageously be output via the operation/display circuit 100 as at the time of call incoming so as to inform the user of the redialing.

Referring again to FIG. 1, each base station 20 includes a fixed radio transmitter/receiver capable of setting up a radio channel between itself and any mobile station 10 existing in its area and interchanging information with the mobile station 10. In the illustrative embodiment, a TDMA digital radio apparatus capable of transmitting and receiving three speech channels and one control channel by TDMA is effectively applicable to the base station 20. Particularly, in the illustrative embodiment, the base station 20 has a message transforming function, i.e., transforms control information received from the associated mobile communication exchange 30 to a control message meant for a particular mobile station 10 and sending it to the mobile station 10 over its reverse radio channel. Specifically, when a call originates from the mobile station, but the called terminal is busy, the base station 20 transforms BUSY information received from the exchange 30 via the control line to a BUSY message, adds the BUSY message to a control field included in the speech channel, and sends it to the mobile station 10.

Figure 3:
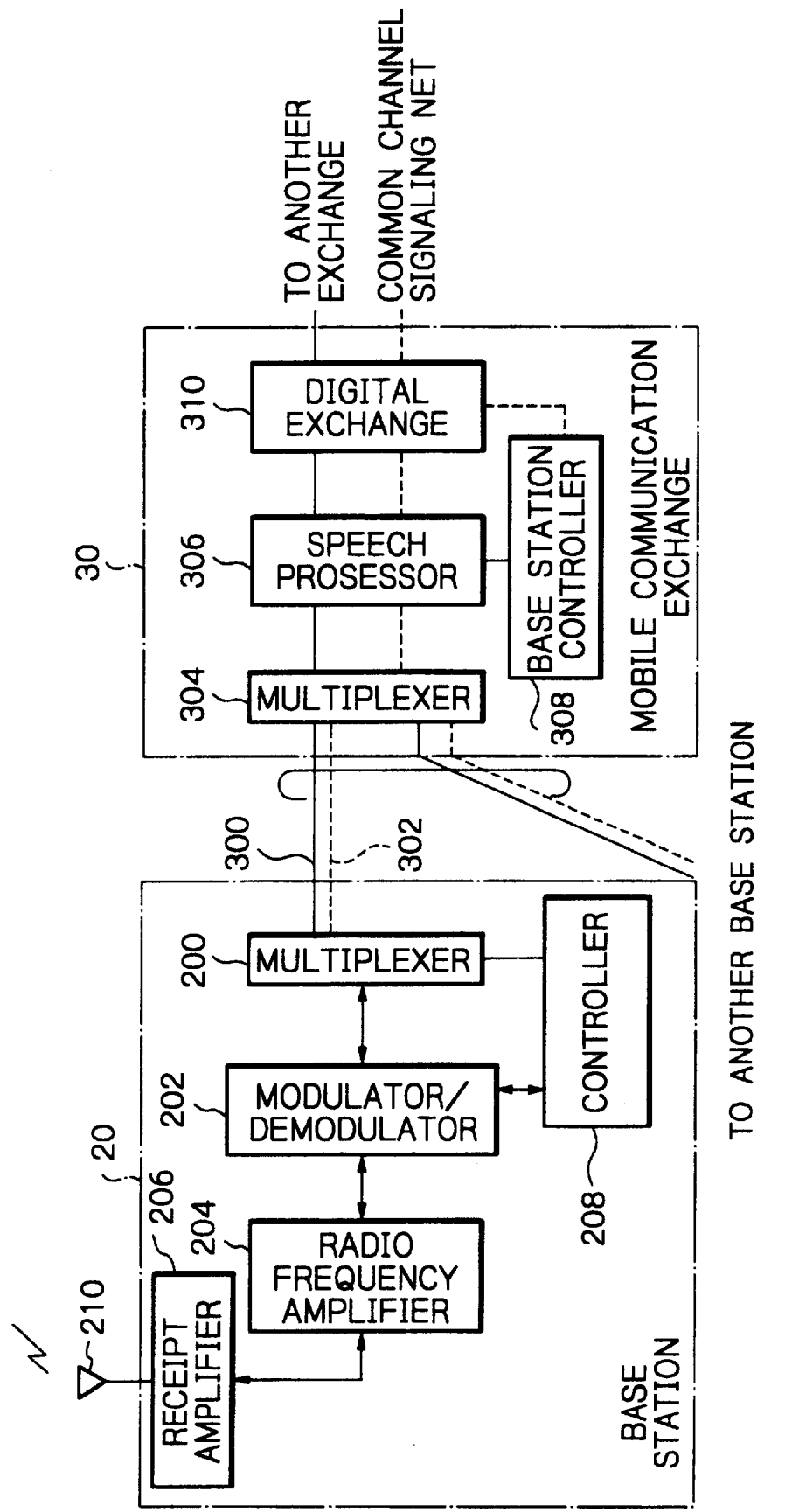
FIG. 3 is a block diagram schematically showing a specific configuration of a base station and a specific configuration of a mobile communication exchange also included in the system of FIG. 1.

FIG. 3 shows a specific construction of the base station 20 and a specific construction of the mobile communication exchange 30. As shown, the base station 20 has a multiplexer 200, a modulator/demodulator 202, a radio frequency amplifier 204, a receipt amplifier 206, and a controller 208. The multiplexer 200 is connected to the mobile communication exchange 30 by a communication circuit 300 and multiplexes the three channels of signals of the mobile station 10 into a single channel and interchanges such signals with the exchange 30 on the communication circuit 300. The communication circuit 300 has a transmission rate of, e.g., 64 kb/s for a channel. Also, the multiplexer 200 is connected to the exchange 30 by a control circuit 302 indicated by a phantom line in FIG. 3. The multiplexer 200 multiplexes control information meant for the individual mobile stations 10 and interchanges them with the exchange 30. Control information received from the exchange 30 is input to the controller 208.

The modulator/demodulator 202 is made up of a modulator for constructing signals of different channels output from the multiplexer 200 into TDMA slots and executing QPSK modulation with the slots, and a demodulator for demodulating received slots and feeding the demodulated slots to the multiplexer 200.

The radio frequency amplifier 204 is a transmitter for subjecting the TDMA slots output from the modulator/ demodulator 202 to radio frequency amplification and transmitting the amplified TDMA slots via an antenna 210. Specifically, the amplifier 204 collectively amplifies a number of radio carriers of different channels for thereby forming a TDMA frame for the reverse radio channel. The receipt amplifier 206 is a receiver for amplifying signals received from the mobile stations 10 via the antenna 210. The receipt amplifier 206 is implemented by a low-noise amplifier located in the vicinity of the antenna 210 and capable of effecting efficient amplification.

The controller 208 controls transmission and receipt between the base station 20 and the mobile stations 10. Specifically, the controller 208 assigns communication channels to the mobile stations 10 and interchanges call control information relating to the mobile stations 10 with the mobile communication exchange 30. Particularly, in the illustrative embodiment, the controller 208 includes a message transform circuit for transforming control information, particularly BUSY information, received from the exchange 30 to a BUSY message representative of the content of the BUSY information. The BUSY message is fed to the modulator/demodulator 202 and added to the control field of the communication channel thereby.

The mobile communication exchange 30 accommodates a plurality of base stations 20 and connects a call originating from any mobile station 10 existing in the area of any base station 20 to a desired link. In the illustrative embodiment, as shown in FIG. 1, the exchange 30 is connected to the public switched telephone network 600 and the exchange 30 of the other service area via transit and gateway office not shown. In this case, the exchanges interchange control information via a control circuit network of a signaling system as in a general public fixed network.

As shown in FIG. 3 specifically, the mobile communication exchange 30 has a multiplexer 304, a speech processor 306, a base station controller 308, and a digital exchange or switch 310. The multiplexer 304 collects and multiplexes the lines extending from the base stations 20 which it accommodates. For example, the multiplexer 304 multiplexes signals coming in through the communication circuit 300 on a digital transmission path whose transmission rate is 1.5 Mb/s to 2 Mb/s.

The speech processor 306 includes a coder/decoder for demodulating speech signals efficiently coded by the mobile stations 10 and effecting, e.g., PCM (Pulse Code Modulation) with the decoded signals or for performing the opposite operation.

The base station controller 308 controls the base stations 20 subordinate to the exchange 30. Specifically, the controller 30 executes call control including the setting and releasing of a call, channel control relating to the setting and releasing of a channel effected at each base station 20, and mobile station control including the registration and authentication of the mobile stations 10. Particularly, in the illustrative embodiment, when a call originates from a certain mobile station 10, but the called terminal is busy, the controller 308 transfers BUSY information received from an exchange covering the called terminal via the control circuit network to the base station 20 covering the calling mobile station 20.

As shown in FIG. 1, the public switched telephone network 600 includes a subscriber line exchange or local switch 630 accommodating a conventional telephone terminal or similar subscriber terminal 610 via a subscriber line 620. The exchange 630 connects a call originating on the subscriber terminal 610 to a desired link via a conventional hierarchical system. The exchange 630 is a conventional exchange including a subscriber circuit for controlling the termination of the subscriber line 620, a time division switch or similar switching circuit, and various service trunks.

Reference will be made to FIGS. 4A and 4B for describing an automatic redialing method particular to the illustrative embodiment together with the operation of the above mobile communication system. Assume that a call meant for the telephone terminal 610 originates from one of the mobile stations 10 by way of example.

First, the user of the mobile station 10 operates the station 10 in a preselected manner in order to input the telephone number of the telephone terminal 610. In response, the mobile station 10 sends an origination message to the base station 20 (call connection sequence SS10). Specifically, the telephone number is input on the operation/display circuit 100 and fed to the control circuit 108. In response, the control circuit 108 generates an origination message including the telephone number of the telephone terminal 610. The baseband processing circuit 102 constructs the above message into a TDMA slot and feeds the TDMA slot to the modulation/demodulation circuit 104. The modulation/demodulation circuit 104 modulates the TDMA slot to a preselected frequency channel. The modulated TDMA is sent to the base station 20 via the radio frequency. circuit 106 and antenna 110.

At the base station, the receipt amplifier 206 receives the TDMA slot sent from the calling mobile station 10 via the antenna 210. The modulator/demodulator 202 demodulates the TDMA slot so as to separate the content of the slot as an origination message. The origination message is delivered from the modulator/demodulator 202 to the controller 208. The controller 208 separates information including the telephone number of the telephone terminal 610 from the origination message and sends the separated information to the mobile communication exchange 30.

On accepting the call setting from the mobile station 10, the mobile communication exchange 30 causes its base station controller 308 to return acknowledgement information and channel control information to the base station 20 on the control line 302. The controller 208 of the base station 20 selects, based on the received channel information, the timing and frequency of an idle speech channel, generates a message designating the idle channel, and feeds the message to the modulator/demodulator 202. The modulator/demodulator 202 constructs the input message into a control slot meant for the calling mobile station 10 at a preselected timing, and then modulates the control slot with the frequency of the reverse control channel. The modulated control slot is sent to the calling mobile station 10 via the radio frequency amplifier 204 and antenna 210 (call connection sequence SS12).

The slot of the channel designating message sent from the base station 20 and received by the antenna 110 of the mobile station 10 is routed through the radio frequency circuit 106, modulation/demodulation circuit 104 and baseband processing circuit 102 to the control circuit 108. In response, the control circuit 108 generates an answer message. The modulation/demodulation circuit 104 modulates the answer message with the frequency of the designated speech channel. The modulated answer message is sent to the base station 20 via the high frequency circuit 106 and antenna 110 at the designated timing (call connection sequence SS14).

On receiving the answer message from the mobile station 10, the base station 20 sets up communication channel between it and the mobile station 10 and, at the same time, sets up a preselected speech path between it and the mobile communication exchange 30 via the multiplexer 200. As a result, a communication path using the speech channel is set up between the mobile station 10 and the exchange 30 (call connection sequence SS16).

On the other hand, the mobile communication exchange 30 sends origination information to the telephone network 600 via the control circuit network. The telephone network 600 transfers the origination information to the subscriber line exchange 630 accommodating the telephone terminal 610. At the same time, each network executes the respective processing for call connection. Consequently, speech paths are sequentially set up between the mobile communication exchange 30 and the subscriber line exchange 630 (call connection sequence SS18).

The subscriber line exchange 630 having received the origination information activates its subscriber circuit assigned to the telephone terminal 610 and thereby acquires the subscriber line 620. Assume that the telephone terminal 610 is busy. Then, the subscriber line exchange 630 sends BUSY information representative of the busy state of the terminal 610 on the control line and sends a busy tone on the speech path of the calling side. As a result, the BUSY information is sent from the telephone network 600 to the mobile communication exchange 30 via the control channel network (call connection sequence SS20). Likewise, the busy tone is sent to the calling mobile station 10 over the speech path set up via the network and the radio link set up by the base station 20 (call connection sequence SS22).

Specifically, at the mobile communication exchange 30 having received the BUSY information from the subscriber line exchange 630 via the control circuit network, the base station controller 308 transfers the BUSY information to the base station 20 via the control line 302. The base station 20 transforms the BUSY information to a BUSY message representative of the busy state of the telephone terminal 610 and sends the BUSY message to the mobile station 10 as a control message in the command field of the speech channel (call connection sequence SS24).

On receiving the BUSY message, the mobile station 10 sets up an on-hook state and releases the speech channel under the control of the control circuit 108 (call control sequence SS26) while setting a timer. When the timer reaches a preselected period of time, the control circuit 108 reads out the origination message stored in the RAM at the time of call origination and again feeds the same message to the baseband processing circuit 102. The modulation/demodulation circuit 104 modulates the origination message to the control channel capable of being received by the base station 10. The modulated message is again sent to the base station 20 via the radio frequency circuit 106 and antenna 110 (call control sequence SS28).

Subsequently, the mobile station 10 receives channel control information designating a speech channel from the base station 20 (call control sequence SS30) as at the time of call origination. As a result, the designated speech channel is set up between the mobile station 10 and the base station 20 (call control sequence SS32). Then, a speech path is again set up between the mobile station 10 and the mobile communication exchange 30 via the base station 20 (call control sequence SS34).

The mobile communication exchange 30 received the call setting from the mobile station 10 via the base station 20, again sends origination information via the control circuit network (call control sequence SS36) and executes call connection processing in order to set up a speech path up to the subscriber line exchange 630. The subscriber line exchange 630 having received the above information activates its subscriber circuit assigned to the telephone terminal 610 and acquires, if the terminal 610 is not busy, the subscriber line 620 so as to call the terminal 610 (call control sequence SS38). At the same time, the exchange 630 sends a ring tone over the speech path on the calling side (call control sequence SS40). Consequently, a ring is generated from the telephone terminal 610 while a ring tone is output from the speaker of the mobile station 10.

When a person hearing the ring tone output from the telephone terminal 610 off-hooks the terminal 610, the subscriber line exchange 630 detects the resulting answer signal (call control sequence SS42). Then the exchange 630 sends answer information to the mobile communication exchange 30 via the control circuit network (call connection sequence SS44). At this instant, the exchange 630 connects the speech path from the calling side to the subscriber line 620 terminating at the telephone terminal 610. Consequently, a speech path is fully set up between the mobile station 10 and the telephone terminal 610, allowing conversation to be held between the two stations 10 and 610 (call connection sequence SS46).

As stated above, in the illustrative embodiment, when a terminal called by any one of the mobile stations 10 is busy, BUSY information is sent from the subscriber line exchange 630 to the base station 20 via the mobile communication exchange 30. The base station 20 sends BUSY information to the control circuit 108 of the calling mobile station 10 on the reverse radio channel as a BUSY message. This allows the mobile station 10 to automatically redial the destination later on the basis of the BUSY message.

The above automatic redialing function is achievable only if a simple program is added to the mobile station 10, i.e., without any circuit added to the mobile station 10. Further, the base station 20 with the existing construction can be easily upgraded only if processing for transforming BUSY information to a BUSY information capable of being received by the mobile station 10 is added to the conventional processing. Likewise, the mobile communication exchange 30 can execute automatic redialing with a minimum of additional circuitry, i.e., only if processing for the transfer of the BUSY information to the base station 20 is added. The mobile station 10 is therefore small size and low cost. Moreover, the entire mobile communication system with the automatic redialing capability can be constructed at a low cost.

The illustrative embodiment has concentrated on the origination of a call meant for a subscriber terminal belonging to a public switched telephone network. The automatic redialing function of the present invention is available even when the call is meant for a mobile station existing in another service area or the same service area, as follows.

In FIG. 1, assume that a call meant for a certain mobile station 10 existing in the service area B is orignates from any one of the mobile stations 10 existing in the service area A, but the called mobile station 10 is busy. Then, the mobile communication exchange 30 covering the service area B sends BUSY information representative of the busy state of the called station 10 to the mobile communication exchange 30 covering the service area A via the control circuit network. In response, the exchange 30 covering the service area A transfers the BUSY information to the base station 20 in charge of the calling station 10, as in the above embodiment. The base station 20 transforms the BUSY-information to a BUSY message and sends the BUSY message to the calling station 10. On receiving the BUSY message, the calling station 10 starts its timer and reads, after the preselected period of time has elapsed, a message to be sent to the called station 10 and again calls the station 10 present in the service area B.

Likewise, assume that the mobile station 10 in the service area A calls another mobile station 10 existing in the service area A, but the called mobile station 10 is busy. Then, the mobile communication exchange covering both of the calling station 10 and called station 10 generates BUSY information representative of the busy state of the called station 10 and sends the BUSY information to the base station 20 in charge of the calling station 10. The base station 20 transforms the received BUSY information to a BUSY message and sends the BUSY message to the calling station 10. On receiving the BUSY message, the calling station 10 starts its timer and reads, on the elapse of the preselected period of time, a message to be sent to the called station 10 and again calls the station 10.

Referring to FIG. 5, an alternative embodiment of the present invention will be described. This embodiment is essentially similar to the embodiment described with reference to FIGS. 1–4B except for the following. As shown, a detector 320 for detecting a busy tone to appear on the communication path is included in the digital exchange 310 of the mobile communication exchange 30. Control information representative of the result of detection of the detector 320 is sent from the exchange 30 to the base station 20. The base station 20 received the control information generates a BUSY message.

Specifically, the detector 320 is included in, e.g., a channel control circuit, not shown, accommodating a communication channel 312 which connects the digital exchange 310 to the network. The detector 320 delivers the result of detection to the base station controller 308.

In this embodiment, while the detector 320 is detecting a busy tone, the base station controller 308 searches for the calling mobile station 10 connected to the communication. At the same time, controller 308 generates control information representative of the busy state of the called terminal. The control information is sent from the controller 308 to the controller 208 of the base station 20 covering the calling mobile station 10 on the control line 302. On receiving the control information, the controller 208 of the base station 20 generates a BUSY message 220 meant for the calling mobile station 10.

An automatic redialing procedure particular to the embodiment shown in FIG. 5 will be described with reference to FIGS. 6A and 6B. As shown, when a call originates from any one of the mobile stations 10, the mobile station sends an origination message to the base station 20 covering it in the same sequence SS10 as in the previous embodiment. In response, the base station 20 sends to the mobile communication exchange 30 a call setting request based on the origination message and including the telephone number or ID number of the called terminal as in the previous embodiment. When the exchange 30 acknowledges the above request, the base station 20 assigns a communication channel to the calling mobile station 10 in the sequence SS12.

The calling mobile station 10 given the communication channel sends an answer message to the base station 20 with the frequency of the speech channel in the sequence SS 14, thereby acquiring the communication channel. In response to the answer message, the base station 20 sends control information representative of the content of the message to the mobile communication exchange 30. As a result, a communication path is set up between the mobile station 10 and the mobile communication exchange 30 in the sequence SS16.

On the other hand, the mobile communication exchange 30 sends, in the sequence SS18, origination information to the subscriber line exchange 630 accommodating the subscriber terminal or called terminal 610. At the same time, the exchange 30 executes call connection processing in order to connect the speech path to the subscriber terminal 630 via, in this case, the telephone network 600.

When the subscriber line exchange 630 determines that the subscriber terminal 610 is busy, it sends BUSY information to the mobile communication exchange 30 via the control circuit network in the sequence SS20. In addition, the exchange 630 sends a busy tone to the speech path on the calling side in the sequence SS22.

When the detector 320 included in the mobile communication exchange 30 detects the busy tone, it delivers the result of detection to the base station controller 308 also included in the exchange 30. In response, the controller 308 locates the calling mobile station 10, generates control information representative of the busy state of the called terminal 610, and sends the control information to the base station 20 in charge of the calling base station 10. The base station 20 having received the control information generates a BUSY message and sends the BUSY message to the calling mobile station 10 on the reverse radio channel in the sequence SS24.

The calling mobile station 10 received the BUSY message releases the communication channel in its off-hook state and sets the timer in the sequence SS26. When the preselected period of time elapses, as counted by the timer, the calling mobile station 10 reads the origination message used in the sequence SS10 and again calls the subscriber terminal 610 in the sequence SS28 as in the previous embodiment. Thereafter, a communication path is set up between the mobile station 10 and the mobile communication exchange 30 and then between the mobile station 10 and the subscriber line exchange 630 via the telephone network 600. When the subscriber terminal 610 answers the incoming call, conversation is held between the mobile station 10 and the subscriber terminal 610 connected to the telephone network 600.

As stated above, in this embodiment, the mobile communication exchange 30 detects a busy tone output from the subscriber line exchange 630 to the speech path. The base station 20, based on the result of detection received from the exchange 30, sends a BUSY message to the calling mobile station 10. The calling mobile station 10 can therefore automatically redial the subscriber terminal 610 upon the lapse of the preselected period of time on the basis of the received BUSY message.

Again, it should be noted that the automatic redialing function of the present invention is available even when the call is meant for a mobile station existing in another service area as well as the same service area.

In the procedures shown in FIGS. 4A and 4B and FIGS. 6A and 6B, the subscriber terminal 610 is assumed to answer the calling mobile station 10 when redialed only once. Of course, if the subscriber terminal 610 is still busy at the time of redialing, the various sections shown and described may repeat the redial processing a preselected number of times or until the subscriber terminal 610 responds to the call.

FIGS. 7A and 7B show an automatic redialing procedure representative of another alternative embodiment of the present invention. The procedure to be described is practicable with a configuration substantially identical with the configuration described with reference to FIGS. 1–3. Briefly, this embodiment differs from the previous embodiments in the following respect. Assume that a call meant for the subscriber terminal 610 of the telephone network 600 originates from any one of the mobile stations 10 of the mobile communication network 500, but the subscriber terminal 610 is busy. Then, the subscriber line exchange 630 monitors the communication state of the subscriber terminal 610. On the end of the busy state of the subscriber terminal 610, the mobile communication exchange 30 reports it to the calling mobile station 10 via the base station 20. This allows the mobile station 10 to redial the subscriber terminal 610 immediately.

Specifically, a callback service is generally available with the public switched telephone network 600 between, e.g., fixed subscriber terminals. The callback service is such that when the busy state of a called subscriber terminal ends, a subscriber line exchange detects the end of the busy state and automatically calls back the calling subscriber terminal in order to set up call connection between the two terminals. The illustrative embodiment implements an automatic redialing method for a mobile communication network using such a callback capability of the subscriber line exchange.

Specifically, the subscriber line exchange 630, FIG. 1, includes a storage for temporarily storing origination information received from an exchange on the calling side via the control circuit and including the telephone number of a calling station and that of a called station. The subscriber line exchange 630 is capable of detecting, when the subscriber terminal 610 is busy, the end of the busy state with its subscriber circuit accommodating the subscriber line. On detecting the end of the busy state, the exchange 630 sends end-of-busyness information representative of the end of the busy state to the exchange on the calling side on the control line.

In the illustrative embodiment, the mobile communication exchange 30 is capable of sending, when a call originates from the mobile station 10, origination information including the telephone number of the calling station 10 and that of the subscriber terminal or called terminal 610 to the subscriber line exchange 630 via the control circuit network. At this instant, the exchange 30 adds to the origination information an end-of-busyness detection command commanding the exchange 630 to detect the end of a busy state. On receiving information representative of a busy state from the exchange 630, the exchange 30 searches for the base station 20 accommodating the calling mobile station 10 and indicated by the above information and transfers the same information to the base station located.

In this embodiment, on the receipt of the end-of-busyness information via the mobile communication exchange 30, the base station 20 transforms the information to an end-of-busyness message which can be sent to the calling mobile station 10 on the control channel of the reverse radio channel. The mobile station 10 received the end-of-busyness message automatically redials the subscriber station 610 under the control of the control circuit 108.

In operation, on the origination of a call on any one of the mobile stations 10, a channel is set up between the mobile station 10 and the base station 20 on the radio channel as in the previous embodiments (call connection sequences SS10–SS14). When the mobile communication exchange 30 acknowledges the call, the exchange 30 sets up a communication path between it and the calling mobile station 10 via the base station 20 (call connection sequence SS16). Subsequently, the exchange 30 sends origination information including the telephone number of the mobile station 10, the telephone number of the subscriber terminal 610 and end-of-busyness detection command to the subscriber line exchange 630 via the control circuit network (call connection sequence SS18).

The subscriber line exchange 630 temporarily stores an identification, such as the telephone number or ID number, of the mobile station 10 and that of the subscriber terminal 610 included in the origination information in its storage (call connection sequence SS50). In this condition, the exchange 630 determines whether or not the subscriber terminal 610 for which the call is meant is busy. If the subscriber terminal 610 is busy, then the exchange 630 sends BUSY information to the control channel (call connection sequence SS20) as in the previous embodiments while outputting a busy tone to the speech path on the calling side. The busy tone is sent to the mobile station 10 via the telephone network 600, mobile communication network 500, and speech path set up between the mobile communication exchange 30 and mobile station 10 via the base station 20 (call connection sequence SS22).

Hearing the busy tone, the user of the mobile station hangs up the station 10 in order to disconnect the channel. As a result, the speech channel between the mobile station 10 and the base station 20, as well as the other speech circuits, is released (call connection sequence SS26).

On the other hand, the subscriber line exchange 630 having received the end-of-busyness detection command monitors the state of the subscriber terminal 610 with its subscriber circuit accommodating the subscriber line 620. On detecting the on-hook of the subscriber terminal 610, the exchange 630 generates end-of-busyness information and sends it to the mobile communication exchange 30 via the control circuit on the basis of the ID number of the calling mobile station 10 (call connection sequence SS52).

On receiving the end-of-busyness information via the control circuit network, the mobile communication exchange 30 transfers the information to the base station 20 covering the calling mobile station 10 via its base station controller 310. In response, the base station 20 transforms the end-of-busyness information to a corresponding end-of-busyness message and sends the message to the mobile station 10 on the control channel of the reverse radio channel (call connection sequence SS54). The mobile station 10 received the end-of-busyness message again calls the subscriber terminal 610 with its redialing function.

The above redialing step is followed by the same sequence of steps as in the previous embodiments. Specifically, after the base station 20 has set up a speech channel, the subscriber line exchange 630 activates the subscriber terminal 610 while outputting a ring tone to the speech path. As a result, the user of the mobile station 10 hears the ring tone while the person at the subscriber terminal 610 hears a ringing. When the person at the subscriber terminal 610 off-hooks the terminal 610, the exchange 630 detects the off-hook and connects the speech path. This allows conversation to be held between the mobile station 10 and the subscriber terminal 610.

As stated above, on detecting the end-of-busyness of the subscriber terminal 610, the subscriber line exchange 630 sends the result of detection or end-of-busyness information to the base station 20 in charge of the calling mobile station 10 via the mobile communication exchange 30. The base station 20 transforms the end-of-busyness information to a corresponding end-of-busyness message and sends the message to the mobile station 10 on the control channel. This allows the mobile station 10 to redial the subscriber station 610 efficiently. Because conversation on the subscriber station 610 has just ended, the call from the mobile station can be almost surely connected to the subscriber terminal 610.

Figure 8B:
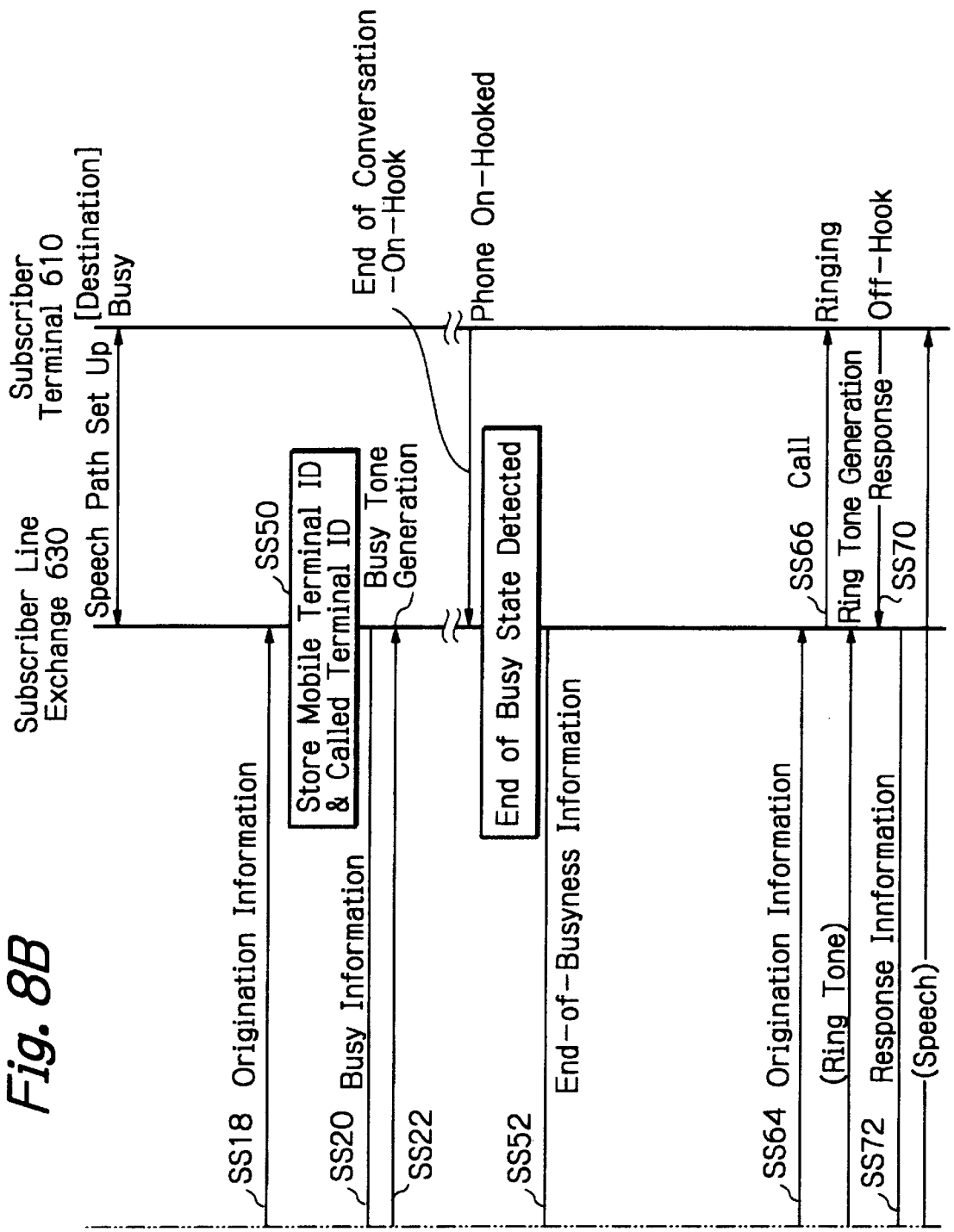

FIGS. 8A and 8B demonstrate a redialing procedure representative of a further alternative embodiment of the present invention. The redialing procedure to be described differs from the procedure of FIGS. 7A and 7B in that on the end of the busy state of the subscriber terminal 610, the mobile communication exchange 30 redials the terminal 610 in response to the end-of-busyness information output from the subscriber line exchange 630 and sets up a communication path for the mobiles station 10.

Specifically, assume that the mobile communication exchange 30 has received the end-of-busyness information from the subscriber line exchange 630 belonging to the telephone network 600. Then, the exchange 30 prepares itself for redialing the subscriber terminal 610 via the telephone network 600 on the basis of the ID number of the subscriber terminal 610 included in the above information. At the same time, the exchange 30 informs the base station 20 in charge of the calling mobile station 10 of the fact that it will redial the subscriber terminal 610.

The base station 20 informed of the redialing to occur generates a redial message in a call connection sequence SS60 and sends it to the calling mobile station 10 on the reverse control channel. At this instant, the base station 20 should preferably assign a communication channel to the mobile station 10. The mobile station 10 having received the redial message reports the redialing to occur to the user of the station 10. If the user is ready to respond to the redialing, the mobile station 10 acquires, e.g., communication channel, generates a redial answer message, and returns the message to the base station 20 on the acquired communication channel.

On receiving the redial answer message, the bases station 20 sends control information representative of the content of the message to the mobile communication exchange 30. As a result, a speech path is set up between the mobile station 10 and the mobile communication exchange 30 via the base station 20. The exchange 30 sends origination information to the subscriber line exchange 630 via the control circuit network in a sequence SS64, and then starts redial processing. Consequently, a speech path is set up between the exchanges 30 and 630 via the mobile communication network 500 and telephone network 600.

Subsequently, the subscriber line exchange 630 activates its subscriber circuit assigned to the subscriber terminal 610 for thereby causing the terminal 610 to generate a ringing. At the same time, the exchange 630 sends a ring tone on the speech path on the calling side (sequence SS64). When the person at the subscriber terminal 610 picks up the terminal 610, the exchange 630 detects the picks up and connects the speech path (sequence SS70). In addition, the exchange 630 sends answer information to the mobile communication exchange 30 (sequence SS72). Consequently, a speech path is set up between the mobile station 10 and the subscriber terminal 610 (sequence SS74), allowing conversation to be held between the two stations 10 and 610.

As stated above, in the illustrative embodiment, as soon as the busy state of the called terminal 610 ends, the subscriber line exchange 630 on the called side sends end-of-busyness information to the mobile communication exchange 30 and causes it to redial the terminal 610. Therefore, only if processing, as distinguished from a circuit, for responding to the redial message is added to the mobile station 10, the automatic redialing capability is effectively achievable.

The embodiments shown in FIGS. 7A and 7B and FIGS. 8A and 8B each has concentrated on the origination of a call meant for the fixed terminal 610 of the public switched telephone network 600 and originated on the mobile station 10 of the mobile communication network 500. However, the automatic redialing function of the present invention is available even when the call is meant for another mobile station 10 existing in another service area as well as the same service area. In such a case, the mobile communication exchange 30 on the called side may be additionally provided with a function of detecting the end of the busy state of the called mobile station 10.

In the embodiments shown and described, the mobile stations 10 and base stations 20 are connected by TDMA radio channels. The present invention is, of course, practicable with any other suitable radio system.

In summary, it will been that the present invention provides an automatic redialing method for a mobile communication network and a mobile communication system capable of automatically redialing, when a terminal called by a mobile station is busy, the called terminal without resorting to any manual operation on the mobile terminal. Such a redialing function can be effectively added to the mobile station in the form of software, i.e., without resorting to any additional circuitry.

The entire disclosure of Japanese patent application No. 95567/1998 filed on Apr. 8, 1998 and including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. An automatic redialing method that enables a mobile station of a mobile communication network to redial when a called terminal is busy, said method comprising the steps of:

sending, from a mobile station exchange when a call originates from said mobile station, origination information including a first identification assigned to said mobile station and a second identification assigned to said called terminal, to an exchange accommodating said called terminal on a control line;

storing, in said exchange accommodating said called terminal, when said called terminal is busy, the first and second identifications, monitoring a state of said called terminal, and sending, upon detecting an end of a busy state of said called terminal, end-of-busyness information including the first and second identifications to said mobile communication exchange on said control line;

transferring, by said mobile communication exchange having received said end-of-busyness information, based on the first identification included in said end-of-busyness information, said end-of-busyness information to a base station corresponding to said mobile station;

generating, by said base station having received said end-of-busyness signal, a corresponding end-of-busyness message, and sending said end-of-busyness message to said mobile station on a control channel of a reverse radio channel; and re-dialing by said mobile station having received said end-of-busyness message, said called terminal.

2. A mobile communication system, accommodating a first mobile station on a radio channel and connectable to at least a public network, said system comprising:

a base station that sets up a radio channel between said base station and said first mobile station; and a first mobile communication exchange that accommodates said base station to connect calls originating from a mobile station to a desired link including the public network, wherein when a call originates from said first mobile station, said first mobile communication exchange sends origination information including a first identification of said first mobile station and a second identification of a called terminal to an exchange that accommodates said called terminal on a control line;

wherein said exchange that accommodates said called terminal stores, when said called terminal is busy, the first and second identification, monitors a state of said called terminal and sends, upon detecting an end of a busy state of said called terminal, end-of-busyness information including the first and second identifications to said first mobile communication exchange on said control line;

wherein said first mobile communication exchange includes transferring means for transferring the end-of-busyness information received from said exchange to said base station corresponding to said first mobile station;

wherein said base station includes message transforming means for transferring, upon receiving said end-of-busyness information from said first mobile communication exchange, said end-of-busyness information to an end-of-busyness message indicating the end of the busy state of said called terminal to be sent to said first mobile station; and wherein said first mobile station re-dials said called terminal upon receiving said end-of-busyness message from said base station.

3. A system in accordance with claim 2, wherein said called terminal is a second mobile station, and said exchange that accommodates said called terminal comprises a second mobile communication exchange that stores, when said second mobile station called by said first mobile station is busy, the first and second identification, monitors a state of said second mobile station and sends, upon detecting and end of a busy state of said second mobile station, end-of busyness information including the first and second identifications to said first mobile communication exchange on said control line.

* * * * *